United States Patent [19]

Brunelle

[11] Patent Number: 5,583,712
[45] Date of Patent: Dec. 10, 1996

[54] MAGNETIC RECORDING SYSTEM HAVING SPIRAL TRACKS

[75] Inventor: Philip E. Brunelle, Longmont, Colo.

[73] Assignee: Maxtor Corporation, Longmont, Colo.

[21] Appl. No.: 435,366

[22] Filed: May 5, 1995

Related U.S. Application Data

[63] Continuation of Ser. No. 81,983, Jun. 24, 1993, abandoned.

[51] Int. Cl.$^6$ ..................................................... G11B 5/596
[52] U.S. Cl. ..................... 360/77.07; 360/78.04
[58] Field of Search ............................ 360/77.08, 77.02, 360/77.03, 77.05, 77.07, 77.11, 78.14, 78.04; 369/32

[56] References Cited

U.S. PATENT DOCUMENTS

| | | | |
|---|---|---|---|
| 4,107,746 | 8/1978 | Conway | 360/78.14 |
| 4,636,885 | 1/1987 | Yamada et al. | 360/77.08 |
| 4,873,679 | 10/1989 | Murai et al. | 369/32 |
| 5,111,345 | 5/1992 | Muller | 360/78.14 X |
| 5,223,993 | 6/1993 | Squires et al. | 360/77.08 |
| 5,293,565 | 3/1994 | Jaquette et al. | 369/32 |
| 5,296,995 | 3/1994 | Yonezawa et al. | 360/77.02 X |

FOREIGN PATENT DOCUMENTS

| | | | |
|---|---|---|---|
| 487296 | 5/1992 | European Pat. Off. | 360/78.04 |
| 4-102267 | 4/1992 | Japan | 360/78.04 |

*Primary Examiner*—Aristotelis Psitos
*Assistant Examiner*—James L. Habermehl
*Attorney, Agent, or Firm*—Sheridan Ross & McIntosh

[57] ABSTRACT

A magnetic recording device for recording data onto a magnetic disk in the form of a spiral track. A spindle motor rotates the disk about a pivot point. A transducer writes the data onto the disk as a digital bit stream. The transducer is positioned radially over the disk by a servomechanism. As the servomechanism positions the transducer radially across the spinning disk relative to the rotation of the disk, a spiral track is described upon the disk. A dedicated or an embedded servo system can be utilized with the spiral data track. Furthermore, the servo tracks can take the form of either concentric circles or a spiral. By recording data as a spiral rather than as concentric circles, cumulative seek time delays are minimized.

14 Claims, 6 Drawing Sheets

RADIAL POSITION vs. ROTATION

FIG. 4A

RADIAL POSITION vs. ROTATION

MAGNETIC RECORDING SYSTEM HAVING SPIRAL TRACKS

This is a file wrapper continuation application of application Ser. No. 08/081,983, filed on Jun. 24, 1993 now abandoned.

FIELD OF THE INVENTION

The present invention pertains to the field of magnetic recording systems. More particularly, the present invention relates to an apparatus and method for maximizing the throughput of a magnetic recording system by implementing spiral tracks.

BACKGROUND OF THE INVENTION

Today, most computer systems include one or more magnetic recording devices onto which digital data from the computer system is stored. In this manner, computer programs, textual information, graphics, and numerical data can be stored on a permanent basis for subsequent retrieval.

One such magnetic recording device is known as a Winchester, rigid, or hard disk drive. In a hard disk drive, data is typically stored on an inflexible magnetic disk. The disk is circular, and number of concentric circles or rings, commonly referred to as "tracks", are described upon the surfaces of the disk. It is within these tracks that data is stored as a series of binary bits of information.

A transducer, also known as a "head", is used to write the data from the disk. In many instances, the same transducer is also used to read data from the disk. Commonly, a number of disks are stacked together and are rotated about a spindle. There are as many heads as there are disk surfaces. In other words, a separate head is used to access each surface of the disks.

A servomechanism is used to locate the head in reference to fixed radial locations over the disk surface. It is the function of the servomechanism to reposition the head from one radial location to another radial location. When the computer directs the hard disk drive to position the head on a track which is different from the track wherein the head is presently positioned, this is lo known as a "seek".

Typically, data is written to the first available space. This results in data being written onto the tracks in a semi-random process. Moreover, a computer program typically performs numerous read and write operations per task. Thus, multiple seeks are often required for each time the disk is accessed. Since data cannot be written onto the disk nor can data be read from the disk throughout the duration of a seek, it is of great importance that the seek be completed as rapidly as possible and that fewer seeks are performed to accomplish the same amount of work. It is also imperative that the seek be performed accurately in order to assure that the correct data is accessed.

In the prior art, there exists essentially two different mechanisms for effectuating seeks —dedicated and embedded servo systems. In both types of servo systems, the heads are mechanically arranged such that the relative position among the heads is permanently fixed. In a dedicated servo system, one of the heads, known as the "servo" head, is dedicated to reading prerecorded servo information from a disk. The remaining "data"heads are devoted to the recording of customer or utility data. Because of the mechanics, the radial position of the servo head automatically establishes the radial position of the data heads. The positional accuracy of the data heads is dependent on the thermal and structural integrity of the mechanics connecting the data heads to the servo head.

Sequential data is generally organized such that it is written under all the data heads in a "cylinder" before changing cylinders. Since the radial position reference is completely dependent on the servo head, the switch between data heads for a particular cylinder is virtually instantaneous, as the switching is done electronically. Thus, the elapsed time from start to finish required to write sequential data throughout an entire cylinder is that for as many revolutions as there are data heads. Upon completion, the servo head repositions to the next sequential cylinder of data tracks, and the disk data transfer continues. The rotational position where data transfer continues on the next cylinder is skewed from that of the last data in the previous cylinder by the amount the disk would spin during the seek. This keeps the data transfer delay incurred while changing cylinders at a minimum. The total delay incurred over transfers spanning multiple cylinders is the seek delay required between cylinders.

However, the dedicated servo system has two inherent problems. Dedicating an entire surface for radial positioning reduces the disk surface area available for a user's data storage. This tends to reduce the capacity of the disk drive. Furthermore, improvements in magnetic storage technology lead to ever thinner track widths. This places tighter constraints on the mechanics to maintain constant relative position among the heads. Any misalignment among the servo and data heads could impair the ability of the disk drive to retrieve previously recorded data. Dedicating a recording surface solely for servo information plus the mechanics for rigid head alignment renders the dedicated servo approach increasingly impractical in today's marketplace.

The embedded servo system eliminates the need for a dedicated servo surface by allocating a small portion of each data track to record servo information thereon. Small pieces of servo information are equidistantly spaced around every track. The electronics and firmware dynamically separate the servo information from the data. This allows spin speed and radial position corrections to be made based on the head where data transfer is occurring. Mechanical misalignment of heads becomes relatively insignificant and the drive storage capacity increases by a large fraction of a recording surface. The requirements for mechanical and thermal integrity are significantly reduced.

Nevertheless, embedded servo systems suffer a significant performance penalty in that the repositioning required for each head switch, delays data transfer by a fraction of a revolution. Whereas the dedicated servo drives only incur delay on the last data head of a cylinder for an incremental seek, the embedded servo drive incurs a delay for each and every head switch in addition to the incremental seek at the end of the cylinder.

Therefore, there is a need in the prior art for minimizing the cumulative amount of data transfer delay due to seeks between cylinders and head switches without sacrificing accuracy or diminished storage capacity. It would highly preferable to achieve this goal without significant increase in production costs.

SUMMARY OF THE INVENTION

In view of the problems associated with prior art disk drive systems, the present invention minimizes cumulative delays due to seeks and head switches by recording data in the format of a S spiral rather than as concentric circles. In the present invention, a motor rotates a stack of disks about a spindle. A number of transducers are used to read data from and write data to the disks as digital bit streams. The transducers are positioned radially over the surfaces of the disks by a servomechanism. As the servomechanism positions the transducers radially across the spinning disk relative to the rotation of the disk, spiral tracks are described upon the disks' surfaces. By recording data as a spiral rather than as concentric circles, seek times are minimized because there is less likelihood of experiencing track and cylinder boundary delays for a given sequential and random access request.

In the present invention, either a dedicated or an embedded servo system may be utilized for positioning the transducers. Although the data tracks are maintained in a spiral format, the servo tracks of a dedicated servo system can take the format of a spiral or as concentric circles.

In one embodiment, half of the surface of the disks are recorded in a clockwise spiral, whereas the other half are purposely recorded in a counter-clockwise spiral. This forward/reverse spiral approach allows one surface to be recorded from outer to inner diameter, while the other is recorded from inner to outer diameter.

BRIEF DESCRIPTION OF THE DRAWINGS

The present invention is Hlustrated by way of example, and not by way of limitation, in the figures of the accompanying drawings and in which like reference numerals refer to similar elements and in which.

DETAILED DESCRIPTION

An apparatus and method for magnetic recording utilizing spiral tracks is described. In the following description, for purposes of explanation, numerous specific details are set forth, such as servo systems, track numbers, time delays, etc. It will be apparent, however, to one skilled in the art that the present invention may be practiced without these specific details. In other instances, well-known structures and devices are shown in block diagram form in order to avoid unnecessarily obscuring the present invention.

Common Terminology

The following definitions are intended to facilitate understanding the following detailed description as it applies to the present invention.

Velocity (V): Velocity is a measure of speed and direction of motion of the actuator at any instant in time. Positive velocities indicate movement toward the inner diameter of the disk. Negative velocities indicate movement toward the outer diameter of the disk. Positive velocities can be accompanied by positive, negative, or zero accelerations. Negative velocities can be accompanied by positive, negative, or zero accelerations.

Speed (S): Speed is the scalar value of velocity. It is always a positive value and does not represent direction.

Average Velocity (AV): Average velocity is the sum of all instantaneous velocities throughout a revolution.

Acceleration (A): Acceleration is a measure of a change in velocity. If A is negative and V is negative, the magnitude of V is becoming even more negative. If A is positive and V is negative, then the magnitude of V is becoming less negative. If A is negative and V is positive, then the magnitude of V is becoming less positive. If A is positive and V is positive, then the magnitude of V is becoming more positive. If A is zero, then V is either a positive or negative constant.

Average Acceleration (AA): Average acceleration is the sum of all instantaneous accelerations throughout a revolution.

Constant Velocity (CV): Constant velocity refers to the actuator being at a constant speed in a particular direction (i.e., A=0).

Servo Track: The information recorded on the disk in a concentrically circular manner used for radial positioning of the heads, as practiced in the prior art.

Servo Spiral: The information recorded on the media in a spiral manner which is used for radial positioning of the heads, as practiced in the present invention.

Data Track: The circular path followed by the servo system when transferring data to and from the disk, as is practiced in the prior art.

Data Spiral: The spiral path followed by the servo system when transferring data to and from the disk, as practiced in the present invention.

Position Offset: A mechanism for precisely positioning a data head at a specified distance away from the servo reference, spiral, or track.

Positive Position Offset: A small position deviation away from the center of a reference servo signal toward the inner diameter of the disk.

Negative Position Offset: A small position deviation away from the center of a reference servo signal toward the outer diameter of the disk.

It should be noted that for clarity, the following discussion measures time delays in fractions of a revolution. Disk drives which spin faster will generally have larger fractions, while disk drives having faster seek times will have smaller fractions. These fractions of revolutions actually represent real time delays.

Block Diagram of a Disk Drive

Figure 1:
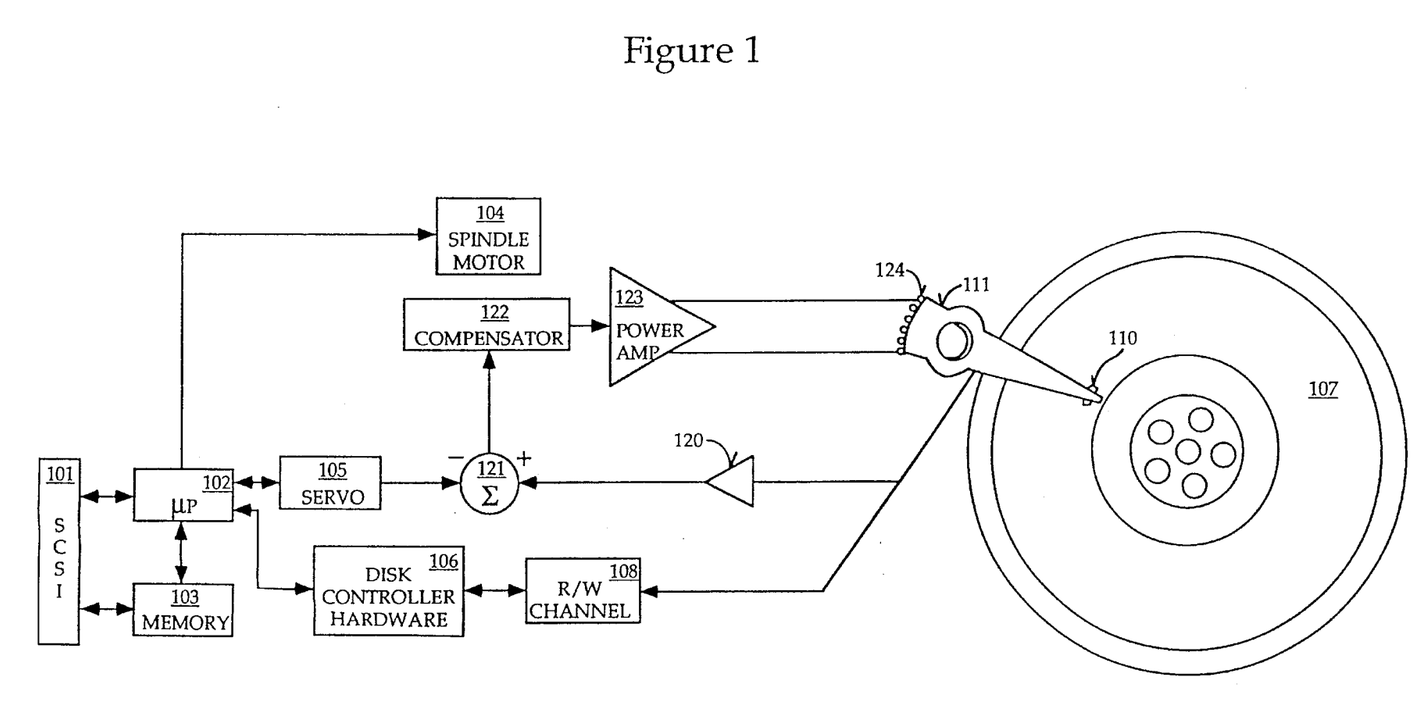
FIG. 1 is a block diagram of a disk drive system upon which the present invention may be practiced.

Referring to FIG. 1, a block diagram of a disk drive system upon which the present invention may be practiced is shown. The disk drive system can include a Small Computer System Interface (SCSI) 101, which provides an interface between the disk drive system and external equipment, such as a computer. The SCSI interface 101 is coupled to a microprocessor 102 and to memory 103. Microprocessor 102 is coupled to and controls the Spindle motor 104, servo mechanism 105, and disk controller hardware 106 per a program stored in memory 103. Spindle motor 104 rotates disk 107 about a spindle. Servo mechanism 105 generates a servo signal which instructs the actuator 111 on the positioning of the transducer 110 for performing a seek. Disk controller hardware 106 receives data signals read from the media 107 through read/write channel 108. The read data is converted into a byte format and is transmitted to the host computer via SCSI 101.

When data is to be written to media 107, the disk controller hardware 106 converts the data into a format compatible for storage, such as a 1,7 encoding scheme. The data signal is sent to read/write channel 108 which processes the signal and sends it to transducer 110. By controlling the spindle motor 104, servo 105, and disk controller 106, the microprocessor 102 can effectively perform seeks to different tracks for read/write operations.

The electrical signal from 110 also contains information regarding the radial location of transducer 110. The electrical signal is a function of the relative difference of the position of the transducer 110 to the nearest track center. This electrical signal is known as the tracking error signal (TES). The TES is amplified by amplifier 120. The amplified TES signal input to summer 121 to be summed with the servo signal provided by servo mechanism 105. Hence, the signal output from summer 121 represents the difference in distance between the present physical location of the spot relative to that of the destination track. The signal output from summer 121 is input to a loop compensator 112 which is used to determine the proper amount of current required to drive the voice motor coil 124 of actuator 111. Power amplifier 123 is used to amplify the signal from compensation network 122 to the voice motor coil 124.

Figure 2:
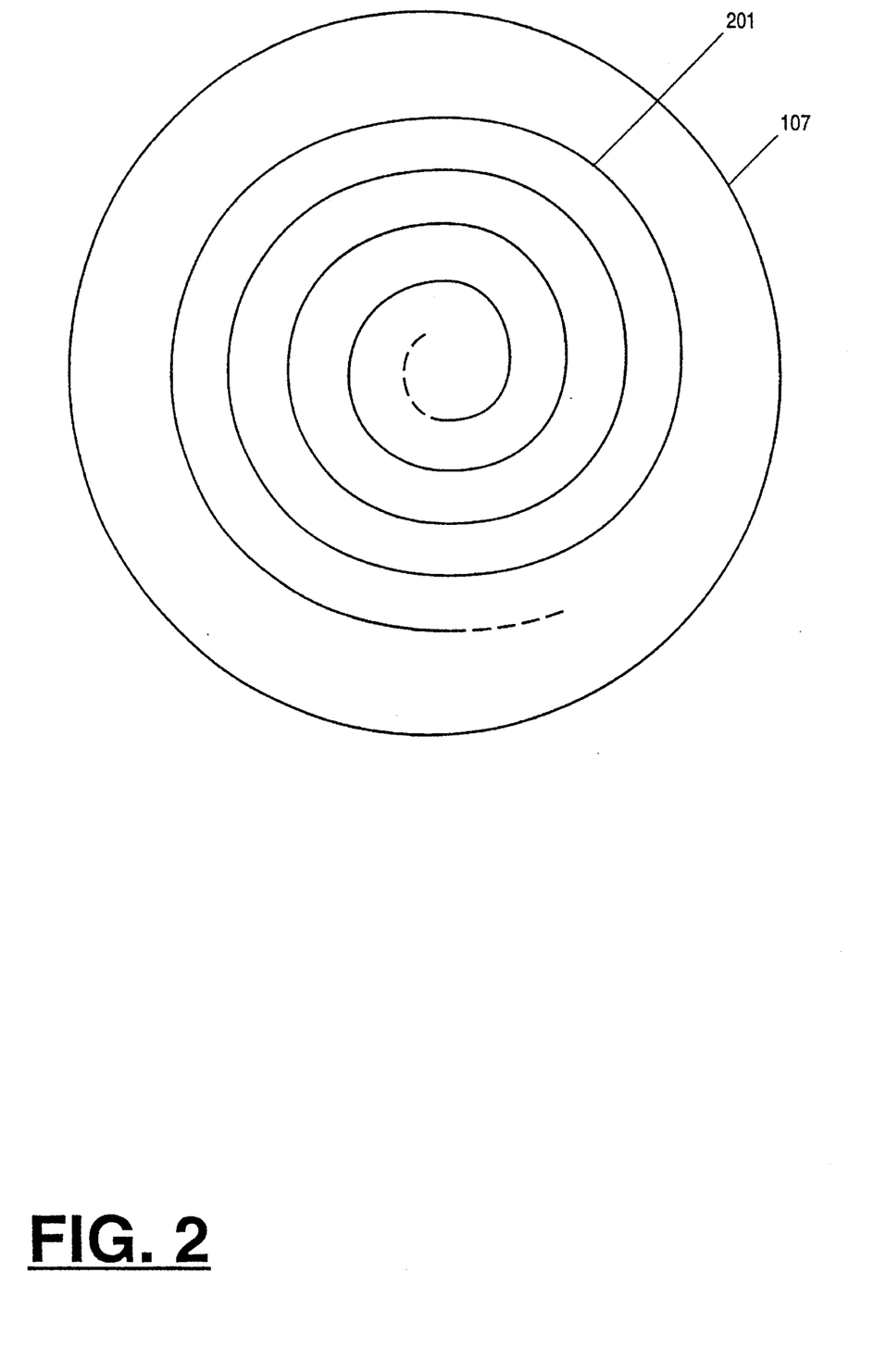
FIG. 2 shows a disk formatted with a data spiral.

Referring to FIG. 2, a disk formatted with a data spiral 201 is shown. Four revolutions of data spiral 201 are shown. The spacing of the spiral has been greatly exaggerated for illustration purposes. With current technology, approximately 2.0 micro inch track pitch can be achieved. The average acceleration for data spiral 201 is approximately 0 and its average velocity is approximately one servo track per revolution while transferring data to and from disk 107. The closed-loop servo system makes positional adjustments to ensure that the spiral is being correctly followed. When neither a seek nor data transfer is in progress, the actuator enters a state wherein the average acceleration and average velocity are both 0 (i.e., stationary).

In the currently preferred embodiment of the present invention, the use of a variable position reference, such as a position offset, allows the positioning of the actuator at any position between two servo tracks. The radial position of the heads is a function of the rotational position of the disks. As described in detail below, this allows the data head to be moved from the center of one servo track to the center of an adjacent servo track in the time required for a single revolution of the spinning disk.

Figure 3A:
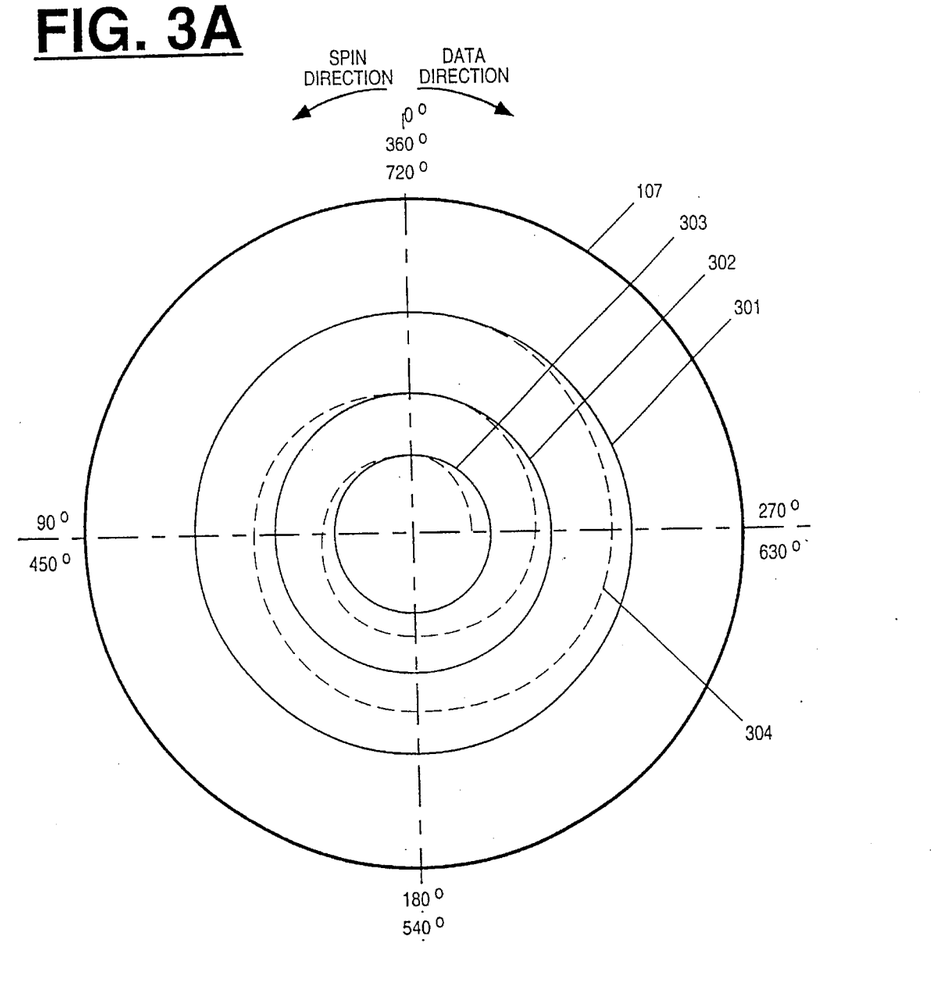
FIG. 3A shows one embodiment of the present invention wherein a disk is comprised of concentric servo tracks and a spiral data track.

FIG. 3A shows one embodiment of the present invention wherein a disk 107 is comprised of concentric servo tracks 301303 and a spiral data track 304. The solid concentric circles depict servo tracks recorded on the disk 107. The dashed line depicts the data spiral achieved with position offset. In the present invention, servo bursts are a function of the degree to which the disks have rotated relative to an initial zero degree reference point.

The servo head initially is positioned directly over the center of the first servo track 301. As disk 107 spins in a counterclockwise direction, the offset towards the next track is increased in the positive direction. Note that as the disk spins counterclockwise, the head, and thus the data spiral, advances clockwise along the disk surface an equal amount. At 180°, the actuator positions the head half way in-between the two tracks 301 and 302. This corresponds to a maximum positive offset from the first servo track 301 and a maximum negative offset from the second servo track 302. As the disk 107 continues to spin, the negative offset from the second servo track 302 is reduced until it is zero at one full revolution of the disk 107. For example, given a 2.0 microinch track pitch, the offset at 45 degrees is 0.25 microinch and the offset at 90 degrees is 0.5 microinch. The offset at 135 degrees is 0.75 microinch; the offset at 180 degrees is 1.0 microinch; etc.

By continuously changing the position offset as a constant function of rotation, a velocity of one servo track per revolution is maintained. While data spiral 304 is being traced, disk data transfer is in progress. Thus, data is written in a spiral while using concentrically circular servo tracks to maintain position.

Figure 3B:
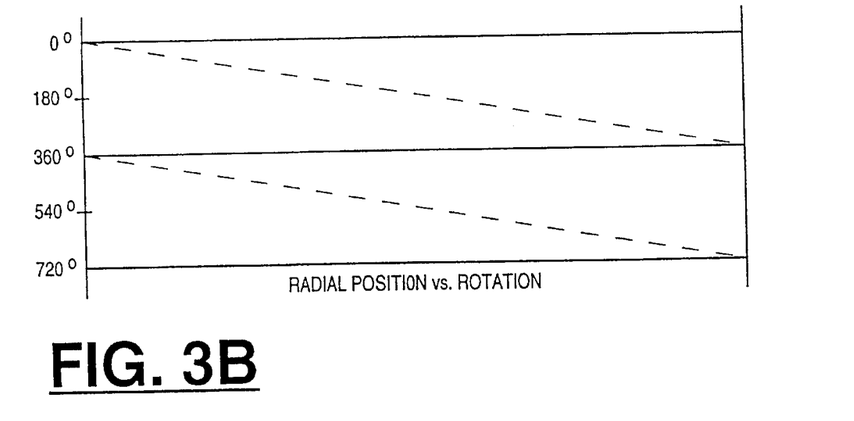
FIG. 3B shows a plot of the radial position as a function of rotation corresponding to recording of the data spiral using servo tracks.

FIG. 3B plots the radial position as a function of rotation corresponding to recording of the data spiral using servo tracks. It can be seen that varying amounts of position offset from reference servo tracks based on rotation position allow for writing a data spiral. This requires that the servo system have the capability of accurately positioning itself at every increment of offset between two adjacent servo tracks.

Note that the geometry of the servo burst references can be either spiral or concentric circles because the present invention supports both spiral movement while transferring data and stationary cases when data transfer is not in progress. For instance, if the servo bursts are arranged as concentric circles, tracking the data spiral is performed with constant velocity offset as a function of rotation. Stationary position is accomplished with a fixed offset between two tracks. Alternatively, stationary position can be accomplished over a single track.

Figure 4A:
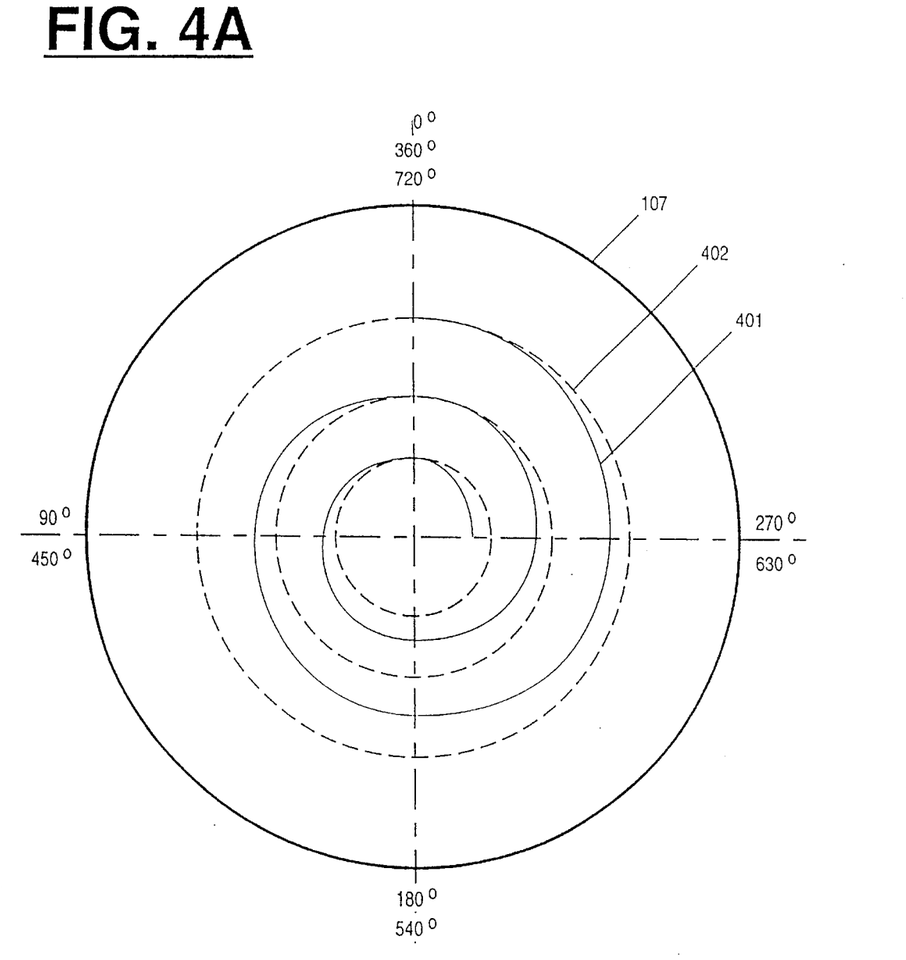
FIG. 4A shows one embodiment of the present invention of implementing a servo spiral with a data spiral.

FIG. 4A shows an alternative embodiment of the recording of a data spiral by implementing a servo spiral. The solid line 401 represents position and data information recorded on disk 107. The dashed line 402 represents the circular path achieved with position offset in times where no motion is desired. If the points of reference are arranged as a spiral, tracking the data spiral maintains zero offset. Consequently, remaining motionless requires position offset as a function of rotational position.

Figure 4B:
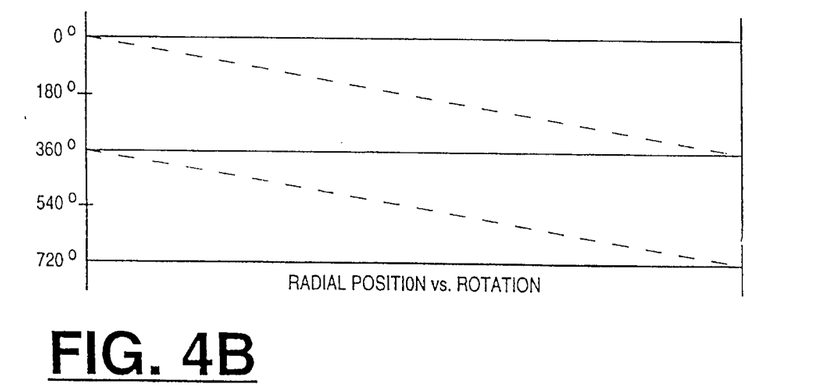
FIG. 4B is a plot illustrating the radial position as a function of rotation corresponding to the data spiral and servo spiral embodiment.

FIG. 4B is a plot illustrating the radial position as a function of rotation corresponding to the data spiral and servo spiral embodiment. It can be seen that by varying the amount of position offset from the reference servo spiral based on rotational position produces a maintainable motionless position.

In the currently preferred embodiment of the present invention, seek algorithms are a function of rotational position. When data tracks are written in concentric circles, the rotational position of the disk is not critical to achieving proper radial position. Eventually, the desired data will be spun so that it is located under the data head. When landing on a data spiral, it is important that the data head lands earlier in the spiral than the desired data so that following the spiral leads to the desired data. In addition, the arrival algorithm is such that the completed seek, when data transfer is to follow, completes with the actuator in motion at the speed of one servo track per revolution. Note that the velocity can be plus or minus one track per revolution, depending on the direction of the spiral. Also, the algorithm allows for starting seeks in either direction while the actuator is moving at one servo track per revolution in either direction.

With spiral recording, a new sequential request often requires a fraction of a servo track's revolution to reposition itself on the data spiral before the ID search begins. This small degradation is inconsequential as long as read-ahead caching prefetches sequential data following the end of the last host request. Furthermore, head-switches and incremental seeks are virtually eliminated. Consequently, each new request can be serviced without the risk of being delayed by actions taken at boundary conditions.

Error recovery is slightly affected by spiral recording. When a block cannot be read, the disk drive attempts to re-read the block in the next revolution. When data is written as data spirals, up to a single servo track seek may be required to reposition before the requiring recovery. But since repositioning can be performed in less that a single revolution, spiral recording poses no performance penalty.

Figure 5A:
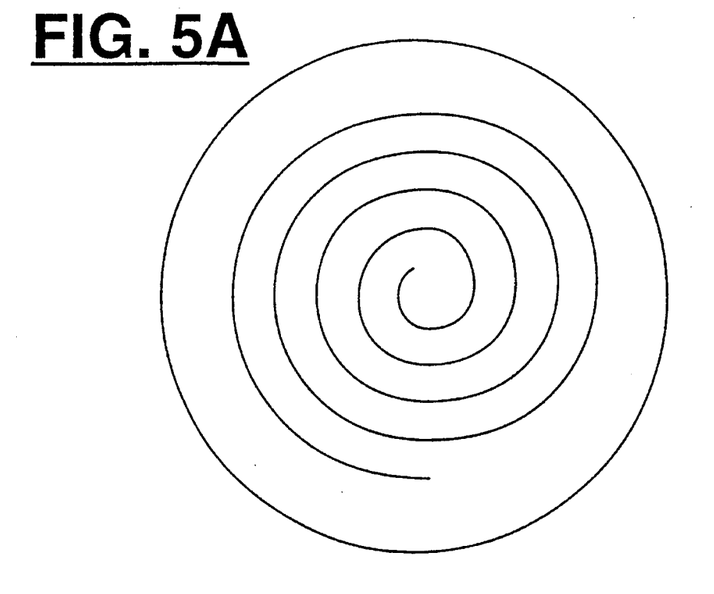
FIG. 5A shows a disk surface having a forward spiral which advances from the outer diameter to the inner diameter.
Figure 5B:
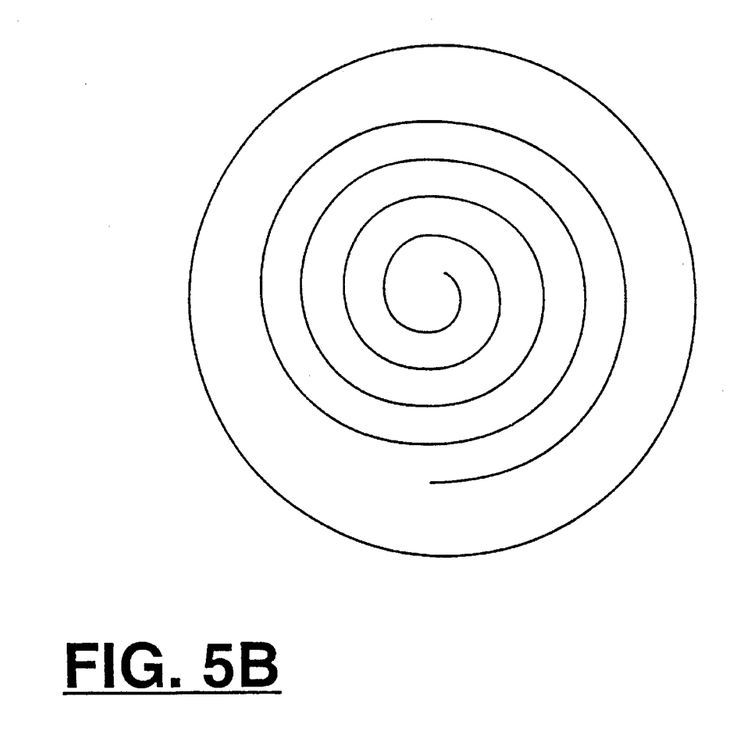
FIG. 5B shows a disk surface having a reverse spiral which advances from the inner diameter to the outer diameter.

In order to fully optimize a spiral implementation, a forward/reverse spiral approach may be implemented. FIG. 5A shows a disk surface having a forward spiral which advances from the outer diameter to the inner diameter. FIG. 5B shows a disk surface having a reverse spiral which advances from the inner diameter to the outer diameter. In this embodiment, one surface of each of the disks is recorded as a forward spiral, while the other surface of each of the disks is formatted as a reverse spiral. In other words, the first surface is recorded in one direction (e.g., outer to inner diameter). Once that surface is completed, a head switch is performed and a spiral is recorded in the opposite direction. Thereby, this embodiment eliminates the full stroke seek back to the start position of the first surface. This process is repeated until all surfaces are recorded. Thus, the contents of the entire pack could be transferred in as many revolutions as there are servo tracks plus n−1 head switch delays, where n equals the number of heads.

In an alternative embodiment of the present invention, a modified version of the forward/reverse spiral scheme can be implemented on a constant-density recording application. This phenomenon is due to the fact that the circumference towards the outer diameters of the disk is greater than those closer towards its center. As the disk spins, the velocity towards the outer parts is greater than the velocity of the inner parts. In order to achieve constant areal density, the data is accessed (i.e., read/write ) at a higher rate (i.e., greater frequency) towards the outer diameter of the disks. Since the highest frequency data is stored at the outer diameters, it is desirable to record at those outer diameters in order to minimize the access time.

Figure 6:
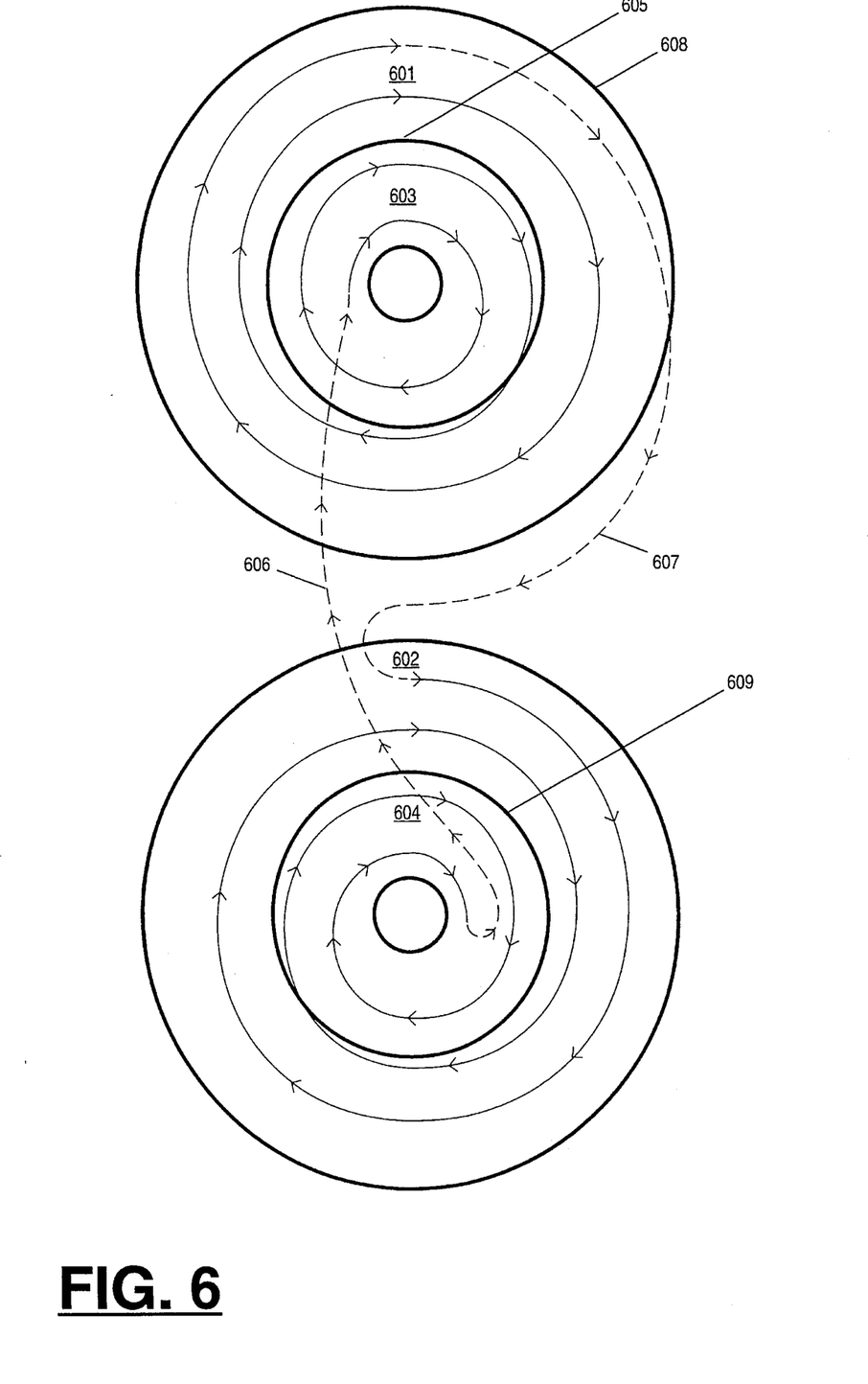
FIG. 6 shows a modified forward/reverse data spiral for constant-density recorded drives.

This is accomplished by dividing the disk into a number of "zones". FIG. 6 shows a modified forward/reverse spiral for constant-density recorded drives. It can be seen that the recording area is broken into concentrically circular zones 601–604. The outer zones 601–602 have higher data rates, while the inner zones 603–604 have lower data rates. The dashed lines 606–607 represent head switches. Since operating systems generally allocate space sequentially from the beginning of the disk pack, it is desirable to use up the higher frequency zones before moving to the next lower frequency zone. The user can implement the forward/reverse spiral algorithm within the zones by zigzagging through the higher frequency zones before moving to the lower frequency zones. By starting the zigzag at the inner diameter 605 of the outer zone 601, the entire outer zone is traversed with only the head switch delay between heads at the outer diameter 608. The outer zone is completed on both heads at the boundary of the next zone 609, eliminating the seek that would be required if recording had started at the outer diameter 608 of that zone. However, there may be a delay due to the change in recording frequencies between the two zones. It should be pointed out that although only two zones on each of two heads are shown in FIG. 6, a single disk can be divided in many different zones for increased efficiency.

Table 1 below shows the time in disk revolutions required to retrieve twelve tracks of data for dedicated, embedded, and embedded spiral servo systems for a four head drive. For illustration purposes, it is assumed that: the storage lost due to servo information on a data track is negligible; each type of device has the same amount of data on its track; cylinder and track skewing are optimized; and command overhead and rotational orientation times are negligible.

TABLE 1

PERFORMANCE FOR FOUR HEAD DRIVE
RETRIEVAL OF TWELVE TRACKS OF DATA

|  | DEDICATED | EMBEDDED | EBEDDED SPIRAL |
| --- | --- | --- | --- |
| read track 1 | 1 | 1 | 1 |
| head switch | 0 | .23 | 0 |
| read track 2 | 1 | 1 | 1 |
| head switch | 0 | .25 | 0 |
| read track 3 | 1 | 1 | 1 |
| head switch | 0 | .25 | 0 |
| head switch/seek | .25 | 0 | 0 |
| read track 4 | 1 | 1 | 1 |
| head switch | 0 | 0 | 0 |
| head switch/seek | 0 | .25 | 0 |
| read track 5 | 1 | 1 | 1 |
| head switch | 0 | .25 | 0 |
| read track 6 | 1 | 1 | 1 |
| head switch | 0 | .25 | 0 |
| head switch/seek | .25 | 0 | 0 |
| read track 7 | 1 | 1 | 1 |
| head switch | 0 | .25 | 0 |
| read track 8 | 1 | 1 | 1 |
| head switch | 0 | 0 | 0 |
| head switch/seek | 0 | .25 | 0 |
| read track 9 | 1 | 1 | 1 |
| head switch | 0 | .25 | 0 |
| head switch/seek | .25 | 0 | 0 |
| read track 10 | 1 | 1 | 1 |
| head switch | 0 | .25 | 0 |
| read track 11 | 1 | 1 | 1 |
| head switch | 0 | .25 | 0 |
| read track 12 | 1 | 1 | 1 |
| Total (revolutions) | 12.75 | 14.75 | 12 |
| Normalized to 1 | 1.06 | 1.23 | 1 |

Table 2 below shows the time in disk revolutions required to retrieve twelve tracks of data for dedicated, embedded, and embedded spiral servo systems for an eight head drive. The same assumptions made above also apply to Table 2.

TABLE 2

PERFORMANCE FOR EIGHT HEAD DRIVE
RETRIEVAL OF TWELVE TRACKS OF DATA

|  | DEDICATED | EMBEDDED | EBEDDED SPIRAL |
|---|---|---|---|
| read track 1 | 1 | 1 | 1 |
| head switch | 0 | .25 | 0 |
| read track 2 | 1 | 1 | 1 |
| head switch | 0 | .25 | 0 |
| read track 3 | 1 | 1 | 1 |
| head switch | 0 | .25 | 0 |
| read track 4 | 1 | 1 | 1 |
| head switch | 0 | .25 | 0 |
| read track 5 | 1 | 1 | 1 |
| head switch | 0 | .25 | 0 |
| read track 6 | 1 | 1 | 1 |
| head switch | 0 | .25 | 0 |
| read track 7 | 1 | 1 | 1 |
| head switch | 0 | .25 | 0 |
| head switch/seek | .25 | 0 | 0 |
| read track 8 | 1 | 1 | 1 |
| head switch | 0 | 0 | 0 |
| head switch/seek | 0 | .25 | 0 |
| read track 9 | 1 | 1 | 1 |
| head switch | 0 | .25 | 0 |
| read track 10 | 1 | 1 | 1 |
| head switch | 0 | .25 | 0 |
| read track 11 | 1 | 1 | 1 |
| head switch | 0 | .25 | 0 |
| read track 12 | 1 | 1 | 1 |
| Total (revolutions) | 12.25 | 14.75 | 12 |
| Normalized to 1 | 1.02 | 1.23 | 1 |

The probability of incurring a boundary delay penalty is based on the number of sequential sectors within boundaries and the size of the requested sequential transfer. Thus, embedded servo drives have track boundaries, and dedicated servo systems have cylinder boundaries. The boundary penalty, which increases the total time needed to complete the request, is incurred when more sequential data sectors are requested than are available between boundaries. For instance, on an embedded servo drive with a track of seventy-two 512-byte sectors, transferring 4096 bytes is the same as requesting eight sequential blocks. If the transfer starts at block 64, blocks 64 through 71 will be transferred without a boundary delay. If the transfer starts at any of blocks 65 to 71, a head switch or incremental seek delay will be incurred between the first and second portions of the data transfer. Embedded servo drives incur the penalty for both head switches and incremental seeks. Because dedicated servo drives do not generally have head switch delays, the distance between boundaries is much larger. In contrast, the embedded spiral servo system of the present invention does not incur the penalty at all (except at constant density recording zone boundaries).

Table 3 below lists the probability of incurring a boundary delay in a given random access 72 sectors/track on a seven data head drive. The probability of incurring a delay on any random request is given by the following formula: %={(# requested blocks−1)/# sequential blocks between boundaries) * 100.

TABLE 3

PROBABILITY OF INCURRING A BOUNDARY
DELAY IN A RANDOM ACCESS 72 SECTORS/TRACK
ON A 7 DATA HEAD DRIVE (96)

| TRANSFER SIZE | DEDICATED | EMBEDDED | EBEDDED SPIRAL |
|---|---|---|---|
| 512 bytes | 0 | 0 | 0 |
| 1K bytes | .20 | 1.4 | 0 |
| 2K bytes | .60 | 4.17 | 0 |
| 4K bytes | 1.39 | 9.72 | 0 |
| 8K bytes | 2.98 | 20.83 | 0 |

In summary, it can be seen that with spiral recording, head switch and incremental seek delays are minimized for both embedded and dedicated servo drives.

Thus, an apparatus and method for spiral recording of data on a direct access storage device by maintaining a constant nonzero velocity is disclosed.

What is claimed is:

1. A magnetic disk system for reducing the time associated with head switches and/or seeks comprising:

disk means for storing digital user data and digital servo data, said disk means having a first surface, a second surface, a first zone on said first and second surfaces in which digital user data is recorded at a first frequency, a second zone on said first and second surfaces in which digital user data is recorded at a second frequency that is less than said first frequency;

wherein said first zone has a first inner diameter and a first outer diameter;

wherein said second zone has a second inner diameter and a second outer diameter;

wherein said digital user data is located in a clock-wise spiral data track on said first surface and in a counter clock-wise spiral data track on said second surface;

a spindle motor for rotating said disk means about a pivot point at a substantially constant angular velocity;

transducer means for transferring digital user data between said disk means and an exterior environment; and a servomechanism for radially positioning said transducer means over said disk means to follow said clock-wise spiral data track and said counter-clockwise spiral data track, wherein said servomechanism includes means for positioning said transducer means to transfer digital user data between the exterior environment and said clockwise and counterclockwise spiral data tracks according to the following sequence:

(1) beginning at said first inner diameter of said first zone on said first surface and ending at said first outer diameter of said first zone on said first surface;

(2) beginning at said first outer diameter of said first zone on said second surface and ending at said first inner diameter of said first zone on said second surface;

(3) beginning at said second outer diameter of said second zone on said second surface and ending at said second inner diameter of said second zone on said second surface; and (4) beginning at said second inner diameter of said second zone on said first surface and ending at said second outer diameter of said second zone on said first surface.

2. A magnetic disk system, as claimed in claim 1, wherein: said digital servo data is located in a concentric servo track.

3. A magnetic disk system, as claimed in claim 2, wherein:
said concentric servo track is located on one of said first surface and said second surface.

4. A magnetic disk system, as claimed in claim 2, wherein:
said disk means includes a third surface; and
wherein said concentric servo track is located on only said third surface.

5. A magnetic disk system, as claimed in claim 1, herein:
said digital servo data is located in a spiral servo track.

6. A magnetic disk system, as claimed in claim 5, wherein:
said spiral servo track is located on one of said first surface and said second surface.

7. A magnetic disk system, as claimed in claim 5, wherein:
said disk means includes a third surface; and
wherein said spiral servo track is located on said third surface.

8. A magnetic disk system, as claimed in claim 5, wherein:
said servo mechanism positions said transducer means to follow said spiral servo track with substantially zero offset.

9. A magnetic disk system, as claimed in claim 1, wherein:
said servo mechanism positions said transducer means at a velocity of approximately one servo track per revolution of said disk means.

10. A magnetic disk system, as claimed in claim 1, wherein:
said spindle motor rotates said disk means, with reference to said first surface, in a counter-clockwise direction.

11. A magnetic disk system for reducing the time associated with head switches and/or seeks comprising:
disk means for storing digital user data and digital servo data, said disk means having a first surface, a second surface, a first zone on said first and second surfaces in which digital user data is recorded at a first frequency, a second zone on said first and second surfaces in which digital user data is recorded at a second frequency that is less than said first frequency;
wherein said first zone has a first inner diameter and a first outer diameter;
wherein said second zone has a second inner diameter and a second outer diameter;
wherein said digital user data is located in a clock-wise spiral data track on said first surface and in a counter clock-wise spiral data track on said second surface;
wherein said digital servo data is located in a concentric servo track;
a spindle motor for rotating said disk means about a pivot point at a substantially constant angular velocity;
wherein said spindle motor rotates said disk means, with reference to said first surface, in a counter-clockwise direction;
transducer means for transferring digital user data between said disk means and an exterior environment; and
a servomechanism for radially positioning said transducer means over said disk means to follow said clock-wise spiral data track and said counter-clockwise spiral data track, wherein said servomechanism includes means for positioning said transducer means to transfer digital user data according to the following sequence:
(1) beginning at said first inner diameter of said first zone on said first surface and ending at said first outer diameter of said first zone on said first surface;
(2) beginning at said first outer diameter of said first zone on said second surface and ending at said first inner diameter of said first zone on said second surface;
(3) beginning at said second outer diameter of said second zone on said second surface and ending at said second inner diameter of said second zone on said second surface; and
(4) beginning at said second inner diameter of said second zone on said first surface and ending at said second outer diameter of said second zone on said first surface;
wherein said servo mechanism positions said transducer means at a velocity of approximately one servo track per revolution of said disk means.

12. A magnetic disk system as claimed in claim 11, wherein:
said digital servo data is one of the following: located on one of said first and second surfaces with said digital user data and located on a different surface than said first and second surfaces.

13. A magnetic disk system for reducing the time associated with head switches and/or seeks comprising:
disk means for storing digital user data and digital servo data, said disk means having a first surface, a second surface, a first zone on said first and second surfaces in which digital user data is recorded at a first frequency, a second zone on said first and second surfaces in which digital user data is recorded at a second frequency that is less than said first frequency;
wherein said first zone has a first inner diameter and a first outer diameter;
wherein said second zone has a second inner diameter and a second outer diameter;
wherein said digital user data is located in a clock-wise spiral data track on said first surface and in a counter clock-wise spiral data track on said second surface;
wherein said digital servo data is located in a spiral servo track;
a spindle motor for rotating said disk means about a pivot point at a substantially constant angular velocity;
wherein said spindle motor rotates said disk means, with reference to said first surface, in a counter-clockwise direction;
transducer means for transferring digital user data between said disk means and an exterior environment; and
a servomechanism for radially positioning said transducer means over said disk means to follow said clock-wise spiral data track and said counter-clockwise spiral data track, wherein said servomechanism includes means for positioning said transducer means to transfer digital user data according to the following sequence:
(1) beginning at said first inner diameter of said first zone on said first surface and ending at said first outer diameter of said first zone on said first surface;
(2) beginning at said first outer diameter of said first zone on said second surface and ending at said first inner diameter of said first zone on said second surface;
(3) beginning at said second outer diameter of said second zone on said second surface and ending at said second inner diameter of said second zone on said second surface; and (4) beginning at said second inner diameter of said second zone on said first surface and ending at said second outer diameter of said second zone on said first surface;
wherein said servo mechanism positions said transducer means to follow the spiral servo track with substantially zero offset.

14. A magnetic disk system, as claimed in claim 13, wherein:
said digital servo data is one of the following: located on one of said first and second surfaces with said digital user data and located on a different surface than said first and second surfaces.

* * * * *